(12) United States Patent
Tyson

(10) Patent No.: US 6,334,733 B1
(45) Date of Patent: Jan. 1, 2002

(54) PIPE CONNECTOR

(76) Inventor: James William Tyson, 317 Sunset La., Prince Frederick, MD (US) 20678

( * ) Notice: Subject to any disclaimer, the term of this patent is extended or adjusted under 35 U.S.C. 154(b) by 0 days.

(21) Appl. No.: 09/443,334

(22) Filed: Nov. 19, 1999

Related U.S. Application Data

(60) Provisional application No. 60/111,159, filed on Dec. 7, 1998.

(51) Int. Cl.[7] .............................. F16D 1/00; F16B 7/18
(52) U.S. Cl. ..................... 403/388; 403/306; 403/353; 403/379.3; 403/379.1
(58) Field of Search ......................... 403/109.4, 109.6, 403/306, 353, 379.2, 379.3, 388, 379.1

(56) References Cited

U.S. PATENT DOCUMENTS

| | | | | |
|---|---|---|---|---|
| 313,777 | A | * | 3/1885 | Sells ..................... 403/388 X |
| 1,458,894 | A | * | 6/1923 | Schwarz ............. 403/379.3 X |
| 2,427,008 | A | * | 9/1947 | Lee ....................... 403/258 X |
| 3,046,040 | A | * | 7/1962 | Luper ......................... 403/388 |
| 4,183,691 | A | | 1/1980 | Van Melle ................. 403/109 |
| 4,515,496 | A | * | 5/1985 | McKay ....................... 403/388 |
| 4,647,241 | A | | 3/1987 | Weber ......................... 403/18 |
| 4,934,861 | A | * | 6/1990 | Weeks et al. ........... 403/388 X |
| 5,078,534 | A | | 1/1992 | White ....................... 403/292 |
| 6,261,028 | B1 | * | 7/2001 | Husson et al. ......... 403/388 X |

FOREIGN PATENT DOCUMENTS

DE            2514844 A1   *  4/1983

* cited by examiner

Primary Examiner—Lynne H. Browne
Assistant Examiner—Ernesto Garcia

(57) ABSTRACT

A pipe connector comprising a contour fitting washer, a contour fitting nut, and a bolt is used to connect tubular members of a structure having a modular tubular framework. The pipe connector connects interfitting tubular members wherein one tubular member has an outer diameter approximating the inner diameter of a second tubular member. Each tubular member has a pair of diametrically opposed holes. When the pipe connector is completely assembled, the head of the bolt resides within a centrally disposed recess formed in the washer, and the nut is flush with the exterior of the tubular member. The pipe connector of the present invention is durable, strong, convenient to assemble, neat, and safety oriented.

3 Claims, 3 Drawing Sheets

PIPE CONNECTOR

CROSS-REFERENCE TO RELATED APPLICATION

This application claims the benefit of U.S. Provisional Patent Application Ser. No. 60/111,159, filed Dec. 7, 1998.

BACKGROUND OF THE INVENTION

1. Field of the Invention

The present invention relates generally to tube connectors and more particularly, to a connector for securing tubular members of a modular assembly. The tube connector of the present invention comprises a contoured washer, a contoured nut, and a bolt.

2. Description of Related Art

Modular tubular assemblies are commonplace and are used to construct a variety of structures ranging from swing sets to flag poles. These tubular assemblies not only require connections between the tubular members that are strong but the connections must also be neat and safe. A common problem that occurs when connecting interfitting pipes, that is, when a pipe of smaller diameter fits inside and is connected to a pipe of larger diameter, is that the bolt that secures the connection protrudes outward from the larger diameter pipe, and poses a risk of physical injury. Another problem associated with connecting interfitting pipes is that the nut that holds the bolt in place often becomes loose, resulting in a substantially weakened connection. If the nut becomes too loose, and the bolt eventually becomes completely displaced, the integrity of the connection is completely compromised.

The prior art describes several types of connectors used to assemble modular tubular structures. A locking element used to secure a modular tubular assembly, such as connected interfitted pipes, is described in U.S. Pat. No. 4,183,691 issued on Jan. 15, 1980 to L. Van Melle. The locking element is used to secure two cylindrical members, wherein one cylindrical member fits inside another cylindrical member. The locking element comprises a curved flat spring having an elongated recess at one end and an inwardly turned locking element pin adjacent the other end. The cylindrical members have apertures that are aligned to permit insertion of the locking element pin. The spring portion of the locking element compressively locks the cylindrical members securely together. The locking element is secured to the outermost cylindrical member by the compressive engagement of the spring portion of the locking element even when the pin is removed from the apertures of the cylindrical members.

U.S. Pat. No. 4,647,241 issued on Mar. 3, 1987 to W. J. Weber describes a connector assembly having a retaining means used to assemble "knock-down" frame structures by joining frame members with fitting or connector members. The disclosed connector assembly allows the frame structures to be easily and quickly assembled and disassembled without the need for separate assembly tools. The retaining means comprises a spring-like band configuration that includes a flexible backbone portion. The backbone portion imparts a somewhat closed and generally C-shaped configuration to the retaining means. When installed, the retaining means is flexed over a joined frame member such that the backbone portion of the retaining means engages at least one half of the perimeter of the joined frame member. Due to its generally C-shaped configuration and spring like characteristics, the retaining means exerts a compressive force on the frame member it overlies, thereby firmly securing the structural members together. The retaining means has an alignment pin that extends radially inward from the backbone portion and engages the frame member to lock the retaining means in place.

A connection system for securing tubular truss members together in a manner that keeps the attachment connectors internal and out of sight is described in U.S. Pat. No. 5,078,534 issued on Jan. 7, 1992 to D. L. White. The connection comprises tubular truss members with diametrically opposite countersunk holes sized to accept flush nuts inserts, screws, and a core connector located intermediate to the tubular truss members. The core connector prevents rotation of flush nut inserts while screws and flush nuts are tightened to secure connection.

The prior art fails to describe a tubular assembly connector with the novel and innovative features of the present invention. None of the above inventions and patents, taken either singly or in combination, is seen to describe the instant invention as claimed. Therefore, there exists the need for a pipe connector that is durable, strong, convenient to assemble, neat and safety-oriented.

SUMMARY OF THE INVENTION

Accordingly, it is a principal object of the invention to provide a connector that produces a strong connection between tubular members.

It is another object of the invention to provide a connector that can be easily and quickly assembled.

It is a further object of the invention to provide a connector that is safety-oriented and that eliminates physical injury that may result from incidental contact with the assembled structure.

Still another object of the invention is to provide a connector that is consistent in shape and appearance with the assembled structure.

It is an object of the invention to provide improved elements and arrangements thereof in a tubular member connector for the purposes described which is inexpensive, dependable and fully effective in accomplishing its intended purposes.

To meet the above objectives, the present invention provides a pipe connector comprising a contour fitting washer, a contour nut, and a bolt. The pipe connector is used to connect two tubular members, wherein one tubular member has an outer diameter approximating the inner diameter of the other tubular member, and each tubular member has a pair of diametrically opposed holes that can be appropriately aligned.

The contour fitting washer has a recess that fits through one of the two pairs of aligned holes that are located on the same side of the tubular members. The washer recess has an opening into which the bolt is inserted. The contour fitting nut has a threaded female receptacle that extends radially inward through the second pair of aligned holes that are located diametrically opposite the first pair of holes, and on the same side of the tubular members. The bolt is inserted into the opening in the washer recess and screwed into the female receptacle of the nut, thereby connecting the tubular members.

When the pipe connector is completely assembled, the head of the bolt resides within the recess of the washer and the nut is flush with the exterior of the tubular members. The pipe connector of the present invention is safety-oriented because no part of the pipe connector extends outward from the surface of the tubular members.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
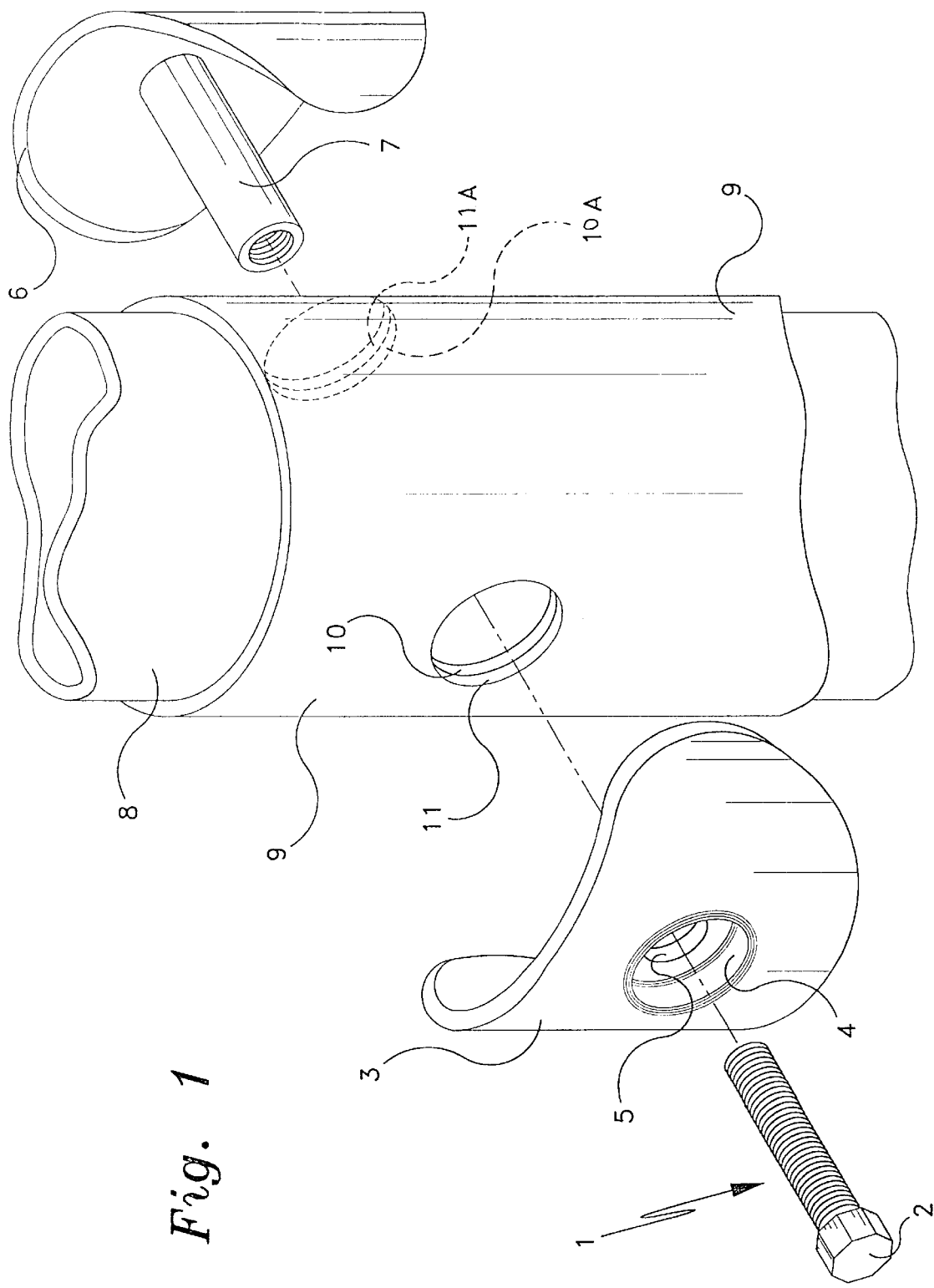
FIG. 1 is an exploded, perspective view of the component parts of a pipe connector according to the present invention.

FIG. 1 shows an exploded, perspective view of the component parts of the pipe connector (1,3,6) of the present invention. The pipe connector (1,3,6) of the present invention is used to connect two interfitting pipes 8 and 9. A smaller pipe 8, having an outer diameter approximating the inner diameter of a larger pipe 9, is inserted inside the larger pipe 9. Prior to assembly, two pairs of diametrically opposed holes (10,10a and 11,11a) are drilled into each of the interfitting pipes 8 and 9. Upon assembly of pipes 8 and 9 the diametrically opposed holes (10,10a and 11,11a) of each pipe are then aligned accordingly as shown in FIG. 1. In FIG. 1, the holes 10a and 11a, diametrically opposed to holes 10 and 11, are shown in dashed lines since they are located on the side of pipes 8 and 9 that is not viewable from this perspective, and would otherwise be hidden. In an alternate embodiment, the diametrically opposed holes (10, 10a and 11,11a) of the interfitting pipes 8 and 9 are drilled after the smaller pipe 8 has been inserted inside the larger pipe 9.

The pipe connector (1,3,6) of the present invention comprises an oblong shaped contoured washer 3 having a centrally disposed circular recess or depression 4, an oblong shaped contoured nut 6 having a centrally disposed elongated threaded female receptacle 7, and a bolt 1, as depicted in FIG. 1. Both the oblong shaped contoured washer 3 and the oblong shaped contoured nut 6 have a generally concave curvature. The circular recess 4 of the contoured washer 3 is sized to snugly fit inside the aligned holes (10,11) of the interfitting pipes 8 and 9. The circular recess 4 has a centrally disposed opening 5 where the bolt 1 is inserted. Both the contoured washer 3 and the contoured nut 6 are contoured to match the curvature of the interfitting pipes 8 and 9. Both the circular recess 4 of the contoured washer 3, and the elongated threaded female receptacle 7 of the contoured nut 6 extend in a radially inwardly direction.

The elements of the pipe connection are joined by inserting the circular recess 4 of the contoured washer 3 into one of the pairs of aligned holes (10,11) until the contoured washer 3 is in abutting engagement with the outer pipe 9. The elongated threaded female receptacle 7 of the contoured nut 6 is inserted into the diametrically opposed pair of aligned holes (10a,11a) until the contoured nut is in abutting engagement with the outer pipe 9 which aligns the centrally disposed opening 5 of the circular recess 4 with the elongated threaded female receptacle 7. The bolt 1 is inserted into and through the centrally disposed opening 5 of the circular recess 4 and into the threaded female receptacle 7 of the contoured nut 6. The bolt 1 is tightly screwed into the female receptacle 7 of the contoured nut 6 to form a strong, neat, and safe connection as depicted in FIG. 2.

Figure 2:
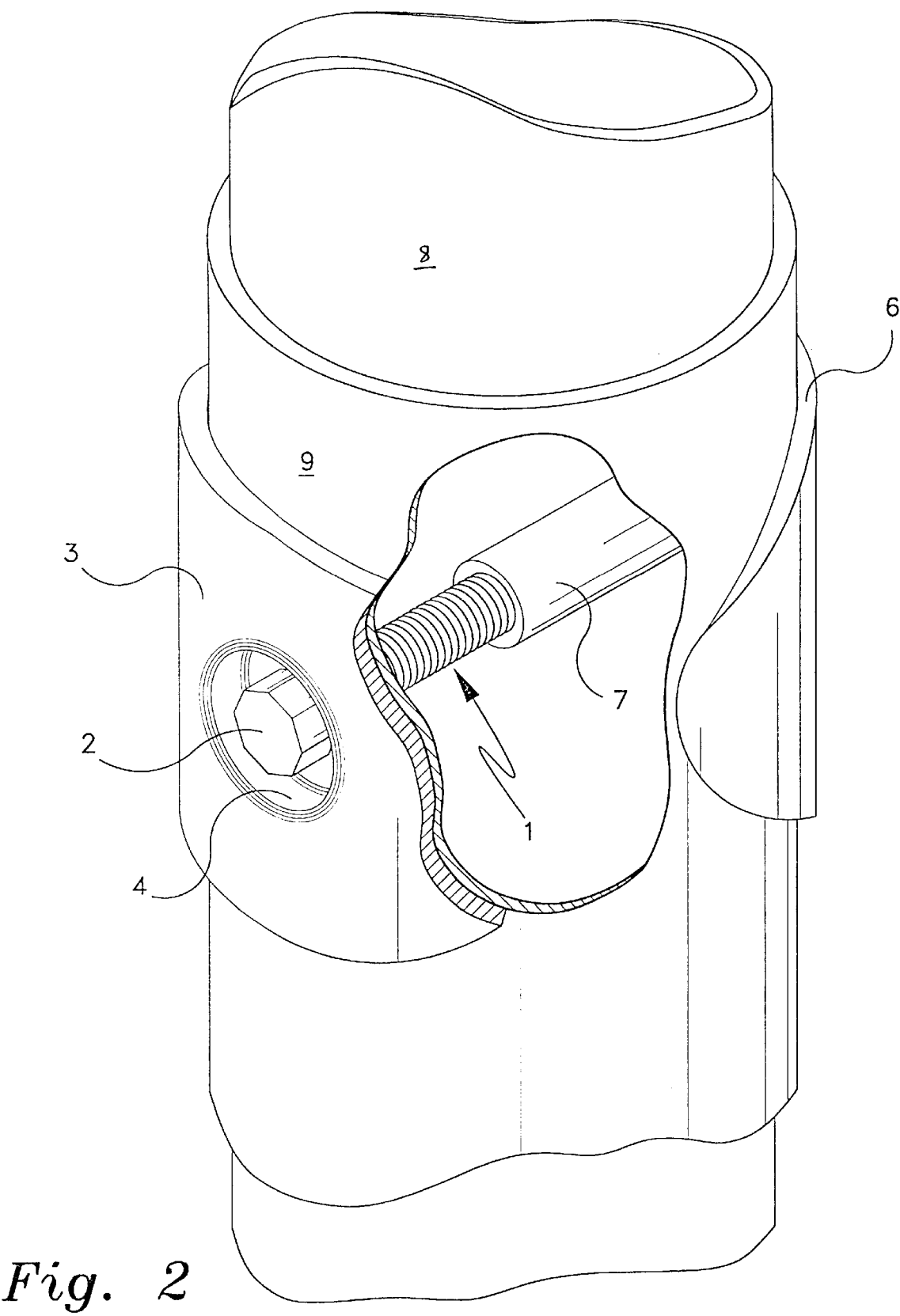
FIG. 2 is an environmental, perspective view of a pipe connector according to the present invention.
Figure 3:
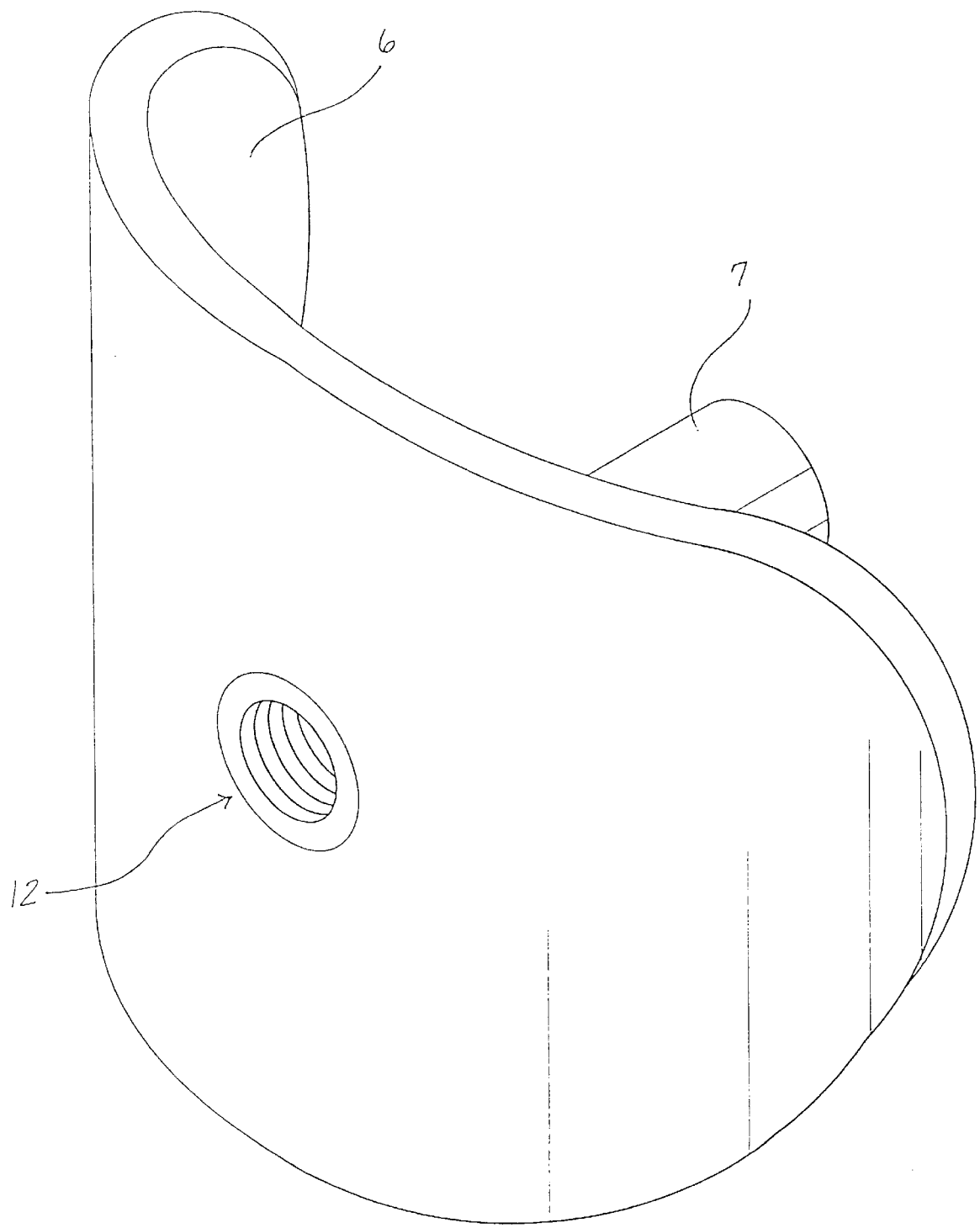
FIG. 3 is a perspective view of the nut portion of a pipe connector according to the present invention.

FIG. 2 shows a perspective view of the preferred embodiment of a fully assembled pipe connector (1,3,6) securely holding together two interfitting pipes 8 and 9. The elongated threaded female receptacle 7 ensures an extremely strong connection. The assembled pipe connector (1,3,6) has no protruding parts to cause physical injury because the head 2 of the bolt 1 resides within the circular recess 4, and the contoured washer 3 and the contoured nut 6 are flush with the exterior surface of the interfitting pipes 8 and 9. The circular recess or depression 4 of the contoured washer 3 is approximately ¼" wider than the head 2 of the bolt 1 which allows for a socket to fit onto the head 2 of the bolt 1 to tighten the bolt 1. In an alternate embodiment, a lockwasher (not shown) can be placed into the circular recess 4 before inserting the bolt 1. FIG. 3 is a perspective view of the contoured nut 6 showing the external opening 12 of the threaded female receptacle 7. The contoured washer 3 and the contoured nut 6 can be made of any suitable material such as a metal or a plastic depending upon the weight bearing capacity of the assembled structure.

The pipe connector of the present invention can be used to assemble a broad spectrum of modular tubular member structures. The pipe connector of the present invention is safe to use to assemble a child's swing set because no part of the tubular connector extends outward from the surface of the tubular members, thereby avoiding physical injury due to incidental contact with the connector. The pipe connector of the present invention has a neat appearance which is important when assembling a highly visible tubular member structure such as a flagpole. The pipe connector of the present invention provides a strong and durable connection that can withstand the rigors of repeated heavy duty use required by some modular tubular member structures, for example, scaffolding.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated, for example, the specific contour of the washer and nut can be tailored to match the specific contour of the interfitting pipes. It is to be understood that the present invention is not limited to the sole embodiments described above, but encompasses any and all embodiments within the scope of the following claims.

I claim:

1. A pipe connector for connecting two interfitted pipes comprising:

an oblong shaped contoured washer having a concave curvature and a centrally disposed recess that extends radially inwardly wherein said recess has a centrally disposed opening and said recess is sized to fit an opening in an interfitted pipe;

an oblong shaped contoured nut having a concave curvature and a centrally disposed elongated threaded female receptacle that extends radially inwardly;

a bolt with a head; and said contour of said washer and said nut being configured to match the contour of an interfitted pipe;

wherein when the pipe connector is assembled said recess and said elongated threaded female receptacle are diametrically opposed and said head of said bolt resides in said recess and a portion of said bolt resides within said elongated threaded female receptacle.

2. A pipe connector for connecting two interfitted pipes according to claim 1, wherein:

said contoured washer and said contoured nut are made of a metal.

3. A pipe connector for connecting two interfitted pipes according to claim 1, wherein:

said contoured washer and said contoured nut are made of a plastic.

* * * * *